Aug. 25, 1953     P. W. MARTIN     2,650,067
APPARATUS FOR LOGGING WELLS WHILE DRILLING
Filed Dec. 13, 1948     2 Sheets-Sheet 1
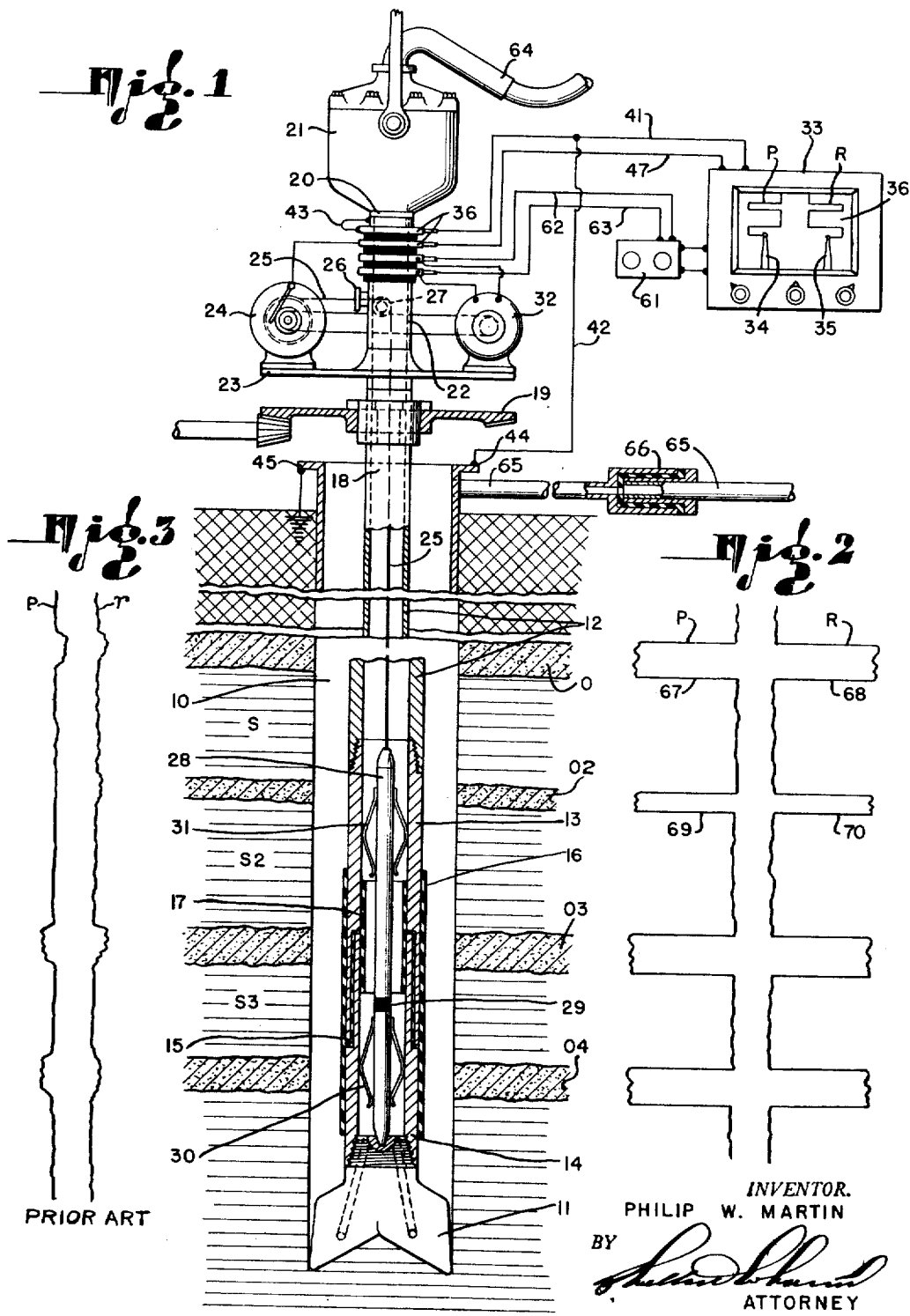
INVENTOR.
PHILIP W. MARTIN
BY
ATTORNEY

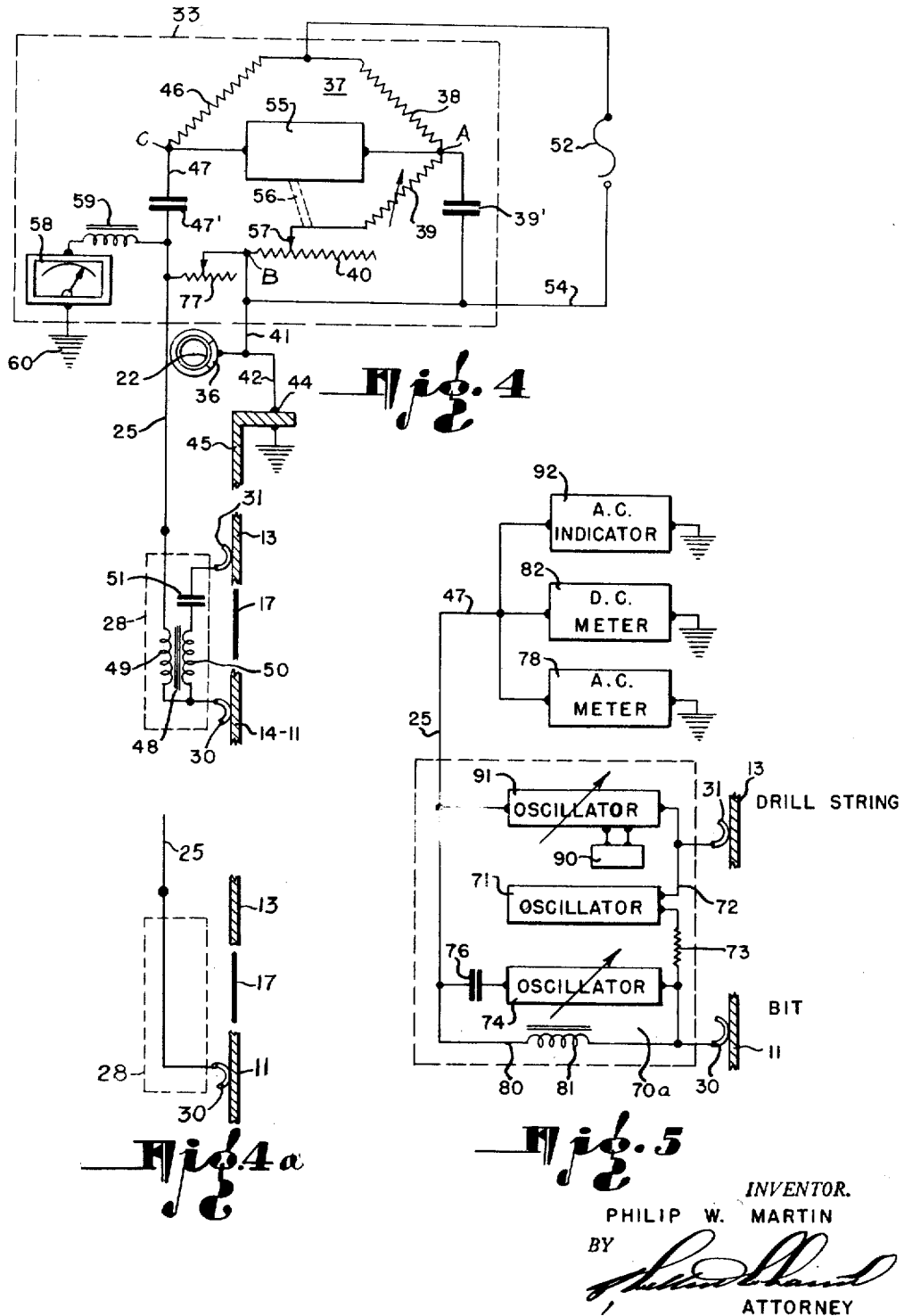

Patented Aug. 25, 1953

2,650,067

UNITED STATES PATENT OFFICE 2,650,067

APPARATUS FOR LOGGING WELLS WHILE DRILLING

Philip W. Martin, Huntington Park, Calif.

Application December 13, 1948, Serial No. 64,971

3 Claims. (Cl. 255—1)

My invention relates to means for logging subsurface formations traversed by a well, and relates in particular to a means for logging and obtaining information from the bottom of the well while it is being drilled.

A number of methods of electrical logging of wells are now in use whereby a graph or chart is formed representative of electrical conditions produced or influenced by changes in formation or sub-surface structure. In these methods changes in resistivity and self-potential are measured. It is an object of the present invention to improve the relative accuracy of the resistivity and self-potential measurements so that a better indication of formation changes or characteristics can be obtained. It is well known that many valuable oil sands exist which are of relatively small vertical dimension, and it is also known that these relatively thin oil formations are passed up during the drilling operation and during subsequent electrical logging operations. For example, in the Barley Patch area in the Huntington Beach Field of California such formations exist which were not indicated by the method of logging there used and were discovered only accidentally. The need for better methods of electrical logging of wells is indicated by instances such as the following which are of record. In abandonment of a supposedly dry well it was decided to salvage the casing, and to accomplish this a cutter was run into the well and the casing was cut, this resulting in a commercial flow of oil from a formation which was not known to exist. In another instance a gun perforator was accidentally discharged 1600 ft. above what was considered to be a productive zone, this resulted in the blowing in of the well before the gun could be removed therefrom. In a further instance the perforator gun was accidentally discharged 100 ft. above the productive zone indicated by the customary method of electrical logging and in what was indicated by the electrical log to be a wet salt water zone. This zone, which had been shown by all indications of cores and electrical logs to be nonproductive, proved to be the best sand in the field.

It is an object of the present invention to provide a method and apparatus for logging a well wherein the drill bit serves as an electrode in engagement with the formation and for providing other valuable information during the drilling operation rather than at a subsequent time. I have found that the electrical characteristics of the formations change somewhat after the drill bit has formed the hole. In many instances these changes are such that the electrical logs do not produce true pictures of the formation characteristics. In a method commonly employed a portion of the well is drilled. The drill string is then removed and then an electrical logging instrument is lowered to log the portion of the well drilled during the immediately preceding period of time. The electrical logs obtained appear to be only averages of true electrical conditions of a group of consecutive formations. One of the reasons for this is that during the time elapsed between the drilling operation and the logging operation well fluids may pass back into receptive formations, or fluids from one portion of the well may move to another portion of the well, thereby producing electrical conditions which are unnatural to the formations at the time of their penetration by the bit. This averaging of the electrical effects also results from the methods of logging employed. For example, a plurality of electrodes are lowered into the well. To obtain resistivity measurements electrical energy is transmitted into the earth from one of the electrodes and a portion of this energy is picked up by or between other electrodes. According to the theory of this method of logging the curve obtained is indicative of the resistivity of a zone encompassed by a hollow sphere, and for this reason averages the resistivity over a large area. In another method, which also only gives averages of conditions, a single electrode is lowered into the well and alternating current is passed therefrom into the earth, a portion of the current being picked up by a ground connection. In my improved method of logging the well while the drilling operation proceeds, very sharp or pronounced curves are obtained as compared to the relatively indistinct curves obtained by use of other methods of logging in the same well after removal of the drill string. The superior results which I obtain are believed to be at least partly due to the fact that the disclosed method of drilling while logging avoids averaging and distortion of self-potential and resistivity curves caused by the in-roads of drilling fluids into the formation, which, I have found cause changes, obliteration and reversal of natural potentials that appear in logs obtained after the drilling of the well.

An important object of the invention is to provide a method and apparatus for obtaining during the drilling of a well valuable information as to conditions in a well being drilled, for guiding the activities of the driller. For example knowledge of pressure and changes therein in the bottom of a well, and also changes in temperature, will indicate to the driller conditions, of utmost importance, as will be hereinafter pointed out, which affect the conduit of the drilling operations and in some instances success or failure of the well-drilling venture.

It is an object of the invention to provide apparatus for obtaining information from the bottom of a well while drilling wherein the sub-surface instrumentalities are carried at the lower end of drill string and are connected with indicating means at the surface through a cable providing an electrical conductor which extends through the drill string during the time the drilling operation proceeds, and which cable, or at least a portion thereof is lifted into the kelly at the upper end of the drill string when it becomes necessary to add more pipe to the upper end of the drill string, this addition of pipe being accomplished by inserting pipe between the lower end of the kelly and the upper end of the string of drill pipe which extends down into the well.

It is a further object of the invention to provide an apparatus for obtaining information from a well while drilling the same, wherein the electrical circuit including instrumentalities at the lower end of the drill string, is formed in part by a continuous electrical conductor which extends through the drill string and rotates with the drill string as drilling operations are conducted.

It is a further object of the invention to provide in this apparatus means for lifting from the drill string, when it becomes necessary to add new pipe to the drill string, a sufficient portion of the electrical conductor, which extends down through the drill string, to enable such addition of pipe to the drill string. It will be understood that the lifting of the electrical conductor may be accompanied by lifting of a part of the sub-surface logging instrumentality. For example, the logging instrumentality may be secured to the lower end of the small cable which carries the electrical conductor, and when the cable is raised within the drill string, the instrumentality is carried upward therewith. On the other hand, the sub-surface portion of the equipment may remain in the lower portion of the drill string, the cable and a portion of the connecting means at the lower end thereof being raised when it is desired to add pipe to the drill string.

A further object of the invention is to provide means for supporting the conductor, which extends through the drill pipe, so that it will rotate with the drill pipe, this means, in the preferred practice of the invention comprising a spool supported on the upper portion of the drill string so as to rotate therewith.

It is a further object of the invention to provide apparatus for obtaining information from a well while drilling the same, this apparatus having sub-surface instrumentalities associated with the lower end of the drill string whereby electrical values of the formation are received and/or measured, indicating means at the surface of the earth for indicating the electrical values, means for directly electrically connecting the string of drill pipe with the surface string of casing which extends down into the upper portion of the well so as to balance the electrical potentials therebetween and means for insulating all metal members or lines which extend into the derrick or which have contact with grounded metal parts such as, the surface string of the well.

Further objects and advantages of the invention may be brought out in the following part of the specification wherein detailed explanations have been employed for the purpose of making a complete disclosure of a preferred embodiment of the invention without limiting the scope thereof which is set forth in the appended claims.

Referring to the drawings which are for illustrative purposes only:

Fig. 1 is a schematic sectional view showing a preferred embodiment of the invention.

Fig. 2 is a graph showing self-potential and resistivity logs characteristic of my new method and apparatus.

Fig. 3 is a graph showing curves such as obtained by another method of logging from the same formation as that of which Fig. 2 is representative.

Fig. 4 is an electrical diagram of the embodiment of the invention shown in Fig. 1.

Fig. 4a is a fragmentary view of a modification of the circuit contained in the probe which is lowered into the well.

Fig. 5 is an electrical diagram showing an alternative form of the invention.

In Fig. 1 I show upper and lower portions of a well 10. At the lower end of the well bore there is a drill bit 11 which has been operated, by rotation of a drill string 12, so as to extend the lower portion of the well 10 through oil sands O, O2, O3 and O4 separated by shale strata S, S2, and S3.

The sub-surface instrumentality of the logging device comprises external electrode means. As shown in Fig. 1, this external electrode means may be formed in part by the bit 11 and by the upper portion of the drill collar 13 comprising the lower part of the drill string 12. The bit 11 constitutes an extension or stem of the drill bit 11 screwed onto a sub 14 which is connected to the lower end of the drill collar 13 and insulated therefrom by an internal layer of insulating means such as rubber 15, an outer tubular insulator 16 and an internal tubular insulator 17 comprising a Bakelite sleeve. At the upper end of the drill string 12 there is the customary kelly 18 adapted to be driven by the customary rotary table 19. The kelly 18 is not connected directly to the rotary part 20 of the swivel 21, but a tubular adaptor 22 connects these parts 18 and 20.

The adaptor 22, has thereon supporting means comprising a platform 23 to carry a reel or spool 24 from which an insulated conductor 25 extends to the interior of the adaptor 22 through a packing gland 26. Within the member 22, the conductor 25 extends over a pulley 27 and then downwardly through the drill string 12. At the lower end of the conductor 25 there is a slender shell or probe 28 having upper and lower portions electrically insulated by insulating means 29. On the lower portion of the shell 28 there are contact elements in the form of bow springs 30 which engage the metal wall of the sub 14, thereby making electrical connection with the bit 11. On the upper portion of the shell 28 there are bow springs 31 which make electrical connection with the upper portion of the drill collar 13. The insulated conductor 25, which I employ, is known as Amergraph cable type 1-H-100 and has an outside diameter of .10 inch. A 15,000 ft. length of this cable weighs 260 lbs. but its breaking strength is 900 lbs. To wind this cable, the reel 24 is 26 in. O. D., 17 in. hub diameter and 5 in. wide. A motor 32 is provided on a platform 23 for rotation of the reel 24 whereby the conductor 25 may be lifted within the drill pipe 12 so as to carry the shell 28 into the Kelly bar 18. When this is done, the Kelly bar 18 may be unscrewed from the top pipe of the drill string 12, and additional pipe may be then inserted between the upper end of the string of pipe and the Kelly bar 18, after which the motor 32 is operated to accomplish lowering of the shell 28 and the conductor 25 through the drill string 12 to the position in which it is shown in Fig. 1. By the use of a small line such as described above, practical conditions of operation are obtained. A 15,000 ft. length of this line can be raised from the bottom at the rate of 1000 ft. per minute, total raising time 15 minutes, by power delivered from a motor not excessive in size. Considering that the line weighs 265 lbs. and the sub-surface instrument at the lower end thereof weighs 30 lbs., the computed power, disregarding friction, required to lift the line and the sub-surface instrument from bottom at the rate selected in the foregoing, would be between 8.83 and 9 horsepower. This is about ¼ to ⅛ of the horsepower that would be required to raise a ¼ inch diameter line at the same rate. This 15 minute time required to move the line through the drill string would not add greatly to drilling time for the reason that it is customary practice at present to circulate mud for a period of time before the drill string is pulled off bottom, the purpose of this circulation being to carry off cuttings which might settle. Also, after pipe is added to the drill string and before or while the string is being lowered to drilling position, mud is circulated to prevent sticking of the bit in whatever cuttings may have settled to the bottom. During these periods of circulation the operations of raising and lowering the line in the drill string are performed.

At the surface of the earth there is indicating means 33 which is electrically coupled with the electrode means at the lower end of the drill string 12. The indicating means is of recording type and has a stylus 34 for inscribing a potential curve P and a stylus 35 for inscribing a resistivity curve R on a graph paper 36 arranged to move upward at a rate proportionate to the downward movement of the drill bit 11. On the upper portion of the adaptor 22 there are slip rings 36 for carrying electrical connections from stationary to rotating parts. Referring to Figs. 1 and 4, the invention has, as a part of the indicating means 33, a self-balancing bridge 37 including on the right hand side thereof a resistance 38, a variable resistance 39, and a variable resistance 40, this variable resistance 40 being connected through a conductor 41 with a ground connection 42. The ground connection 42 is also supplemented by connecting the conductor 41 to the upper end of the adaptor 22 by use of the uppermost of the slip rings 36 which, as shown in Fig. 1, is connected to the upper end of the adaptor 22 by a conductor 43. The ground connection 42 is connected at 44 with the upper portion of the surface string 45. In this manner, not only is a ground provided for one side of the electrical system, but a direct electrical connection is provided between the drill string 12 and the surface string 45. This ground is important for the reason that when the drill string is rotated potentials are produced between the drill string and the surface string. These potentials, by measurement with instruments, are found to be as high as 60 millivolts, which value is greater than some of the formation potentials which must be measured. In electrical logging by the open hole method, significant self-potential variations may be only in the order of 30 millivolts. My invention provides means for preventing potentials between the drill string and the surface string from distorting and effacing significant formation potentials, such means consisting of the direct electrical connection of the drill and surface strings during the logging operations.

On the left hand side of the bridge 37 there is a resistance 46 corresponding to the resistance 38. This resistance 46 is connected through a condenser 47' and conductor means 47 through one of the slip rings 36 to the upper end of the conductor 25. For high resistance adjustment of the bridge an adjustable resistor 77 is bridged across the conductors 41 and 47. The conductor 25 is coupled with the electrode means 11 and 13 by electrical parts contained within the casing or shell 28. As shown in Fig. 4 this coupling means comprises a step down transformer 48 having a high voltage primary winding 49 and a low voltage secondary winding 50. The lower ends of the windings 49 and 50 are connected to the bow springs 30 which in turn carry the electrical connection through the sub 14 and the bit 11 to the formation substance engaged by the bit 11. The upper end of the primary winding 49 is connected to the conductor 25, and the upper end of the secondary winding 50 is connected through a condenser 51 with the upper bow springs 31 which engage the electrode means formed by the drill collar 13. It will be recognized that this drill collar 13 is grounded by reason of its direct metallic connection with the lower end of the string of pipe comprising the drilling string 12.

The system described in the foregoing is energized from a source of alternating current 52 which is connected to the top of the bridge 37 as shown, and is also connected through a conductor 54 which extends to the conductor 41. The bridge 37 includes a galvanometer controlled servo mechanism 55 having a linkage 56 for moving the contact 57 of the variable resistance 40. The movement of the contact 57 is directly related to the movement of the stylus 35, so that as the contact 57 is moved by the servo mechanism 55 to maintain the bridge in balance, the stylus 35 will inscribe the curve R indicative of resistivity of formation between the bit 11 and the exposed upper portion of the drill collar 13. The resistivity exploring circuit, including the winding 50, the condenser 51, and the earth structure between the parts 11 and 13 is energized by inductance from the primary winding 49 of the transformer coupling means 48. For balancing the capacitance between the line 25 and the wall of the well a capacitance 39' is inserted between the resistance 38 and the conductor 54. For the simultaneous recording of the self-potential formation, a millivolt meter 58 is connected with the conductor 25 through an A. C. blocking means 59. The opposite side of the millivolt meter 58 is grounded as indicated at 60. This millivolt meter 58 controls the movement of the stylus 34 of the indicating means 33 for production of the potential curve P.

The mechanism 55 is a self-balancing potentiometer or bridge provided with a strip chart recorder. Several such mechanisms are on the market and are fully described in the literature. The mechanism is phase and voltage sensitive and automatically seeks a condition of balance. It seeks to maintain a zero phase and potential difference between points A and C. If the voltage is higher between A and B than between B and C, the instrument moves the contact 57 (and the stylus 35) to a position to lower the value of the resistance 40 thus balancing the bridge. If, however, the voltage between A and B is lower than between B and C, and naturally of opposite phase, as it is in the opposite legs of the bridge, the instrument moves the contact 57 (and the stylus 35) to increase the value of resistance 40 to automatically bring about a balanced condition.

An additional important feature of the invention resides in the provision of means for calibrating the indicating means 37 and 58 to compensate for changes in line impedance resulting from changes in temperature in the well and changes in conductivity of the insulated conductor 25 from elongation and other causes. The frequency of this calibration will depend upon the conditions encountered in operation. If the temperatures encountered in the well are not high, calibration will be required much less frequently than where high temperatures are encountered. The first step in this calibration consists in calibrating for low resistance. The shell 28 is lifted from the position in which it is shown in Fig. 1 so as to bring both sets of bow springs 30 and 31 inside and into contact with the metal drill collar 13 and the portion of the drill string connected thereto. The resistance of the well circuit is now of course at its lowest point, and at this time the variable resistance 39 is adjusted so as to bring the movable contact 57 of the resistance 40 to zero value. After the aforesaid low resistance calibration the shell 28 is lowered so as to bring the bow springs 30 into the insulator 17. This will remove the bow springs 30 from contact with any metal structure and the current passing through the line 25 will be at minimum value. When the subsurface instrumentality contained in the casing 28 is positioned as just explained, the servo mechanism 55 will immediately act through the linkage 56 to move the contact 57 upscale. The extreme upscale position of the contact 57 may be adjusted by varying the resistance 77 which connects the conductors 47 and 41.

The motor 32 may be of the type customarily employed in elevators and may include automatic braking means and also limiting switches, etc., for preventing overtravel of the conductor 25. A part of the motor control means is contained in switch box 61 from which conductors 62 and 63 are carried to the swivel 21 and are connected through a pair of the slip rings 36 with the motor 32. The conductors 41, 47, 62, and 63 may be secured to and extend along the rubber hose 64 employed to deliver drilling mud to the swivel 21. All metal lines extending into the derrick or having metallic connection with pipes which extend into the well are insulated to prevent stray electrical potentials from affecting the operation of the measuring equipment. To illustrate this feature, I have in Fig. 1 shown a pipe 65 connected to the surface string 45. An insulated connector 66 is inserted in this pipe at a point outside the derrick to keep stray electrical effects from affecting the operation of the logging device.

The operation of the arrangement illustrated in Figures 1 and 4 is as follows. Alternating current flow in the primary winding 49 of transformer 48 excites alternating current flow through the secondary winding 50 and thus impresses a difference in alternating current potential on the bow spring contacts 30 and 31 which are in contact with the drill bit and the drill string respectively. Alternating current is thus caused to flow through the formation surrounding the drill bit 11 and drill collar 13. The resistance to flow of current through this formation influences the impedance of the primary winding 49 of the transformer 48 which affects the balance of the bridge 37. The resistance of the formation is thus recorded by the stylus 35 in the manner outlined above in the description of the instrument 55. The measurement of direct current potential of the bit 11 and of the formation contacting the bit is accomplished in the following manner. This direct current potential is prevented from being impressed on the drill collar 13 by the condenser 51 and the insulator 15. This direct current potential is impressed on the millivolt meter 58 through the conductor 25 and the alternating current blocking inductance 59. The voltage impressed on the millivolt meter 58 controls the position of the recording stylus 34. The alternating current blocking inductance 59 prevents the alternating current potential from being impressed on the millivolt meter 58.

I have found that in logging while drilling, self-potential and resistivity curves such as shown at P and R in Fig. 2 are obtained. These curves have pronounced and readily distinguishable lateral departures 67 and 68 where formation changes are traversed by the drilling bit 11 in forming the hole. Even relatively thin oil sands, such as indicated at O2 in Fig. 1 are clearly shown by departures of the curves P and R indicated at 69 and 70 in Fig. 2. After making a log while drilling a portion of a well, the drill string was removed and the same portion of the well was logged by use of other equipment, which produced curves p and r such as shown in Fig. 3. In some instances the departures of the curve p were found to be of opposite potential from those obtained by use of my method and apparatus, this difference indicating that the passage of water drilling mud into formations had changed relative electrical values. Since the system of logging after drilling only averages changes in electrical effects in the well and the natural conditions have been changed by entry of water from drilling mud into formation, the curves p and r fail to have the clear formation-distinguishing characteristics exhibited by the applicant's curves P and R. As previously mentioned herein the old methods of electrical well logging after removal of the drill string fail to show some oil bearing formations.

In the important alternative form of the invention shown in Fig. 5 I employ as a coupling or measuring means at the lower end of the drill string, an electronic device 70a comprising a self-contained oscillator 71 forming a source of alternating current. This oscillator is connected through a conductor 72 with the upper bow springs 31 and is connected through a resistance 73 with a multi-vibrator or other oscillator 74 controllable by earth resistance or alternating current voltage amplitude. The resistance 73 is also connected to the lower bow springs 30. The oscillator 74 is coupled through a condenser 76 with the conductor 25 which extends through the drill string. The coupling of the oscillator 74 with the conductor 25 must be such that the line comprising the conductor 25 will not seriously load it. The conductor 25 is connected through the conductor 47 with an alternating current meter 78 at the surface, this meter 78 being preferably of recording type and showing changes in resistivity of the formation between and contiguous to the bit 11 and the portion of the drill collar 13 exposed at the lower end of the drill string. For measurement of self-potential formation, the conductor 25 is connected to the bow springs 30 through a conductor 80 having an alternating current blocking means 81, and a direct current meter 82, such for example as a millivolt meter of recording type, is connected through the conductor 47 with the upper end of the conductor 25.

The form of the invention shown in Fig. 5 has means for bringing other information to the surface during the conduct of the drilling operation. The instrumentality at the lower end of the drill string has a sensitive or measuring element 90 which controls the frequency of an oscillator 91 which is tuned so that it will operate in a different frequency band from the oscillator 74. The oscillator 91 is connected to the line 25 and through the bow springs 31 to ground. Through conductor 47, an indicator 92 is connected to the upper end of line 25 and is grounded as shown. In the disclosed form of the invention, the sensitive device 90 comprises a pressure responsive means connected to the oscillator 91 so as to vary the frequency thereof in accordance with changes in pressure in the bottom of the well being drilled with the result that the meter 92 at the top of the ground will at all times during conduct of drilling operations show the pressure existing in the zone of the drill bit which is forming the hole. Knowledge of pressure at the bottom of the hole, during the drilling operation is of great importance, especially when considered in conjunction with the potential and resistivity curves which are being simultaneously made. This information enables the driller to take immediate steps which will prevent blow-out of the well when certain emergencies arise. Sudden rise in pressure in the bottom of the well, especially when accompanied by an indicated change in formation penetrated by the drill bit, is a reliable indication that a high pressure stratum has been penetrated and that immediate steps must be taken to avoid the blowing out of the well. The instrumentality 90 is representative of any means for measuring or responding to a selected parameter in the well during the conduct of drilling operations. It will be understood that in the form of the invention shown in Fig. 5 means of a general character shown in Fig. 1 will be employed for supporting and lifting the conductor 25, or the conductor and the instrument 70a, through the drill string with which this logging equipment is employed.

The arrangement illustrated in Figure 5 operates as follows. The self-contained oscillator 71 impresses a difference in alternating current potential on the bow springs 30 and 31 which are in contact with the bit 11 and drill collar 13 respectively. Alternating current is thus caused to flow through the formation surrounding the bit and drill collar and also through the resistor 73. The resistance of such formation influences the alternating current potential of bow springs 30 which causes the voltage sensitive oscillator 74 to vary its output frequency or amplitude. The output of oscillator 74 is conducted through condenser 76, conductor 25 and conductor 47 to alternating current meter 78 which is sensitive to the frequency range transmitted by the oscillator 74 and which records the resistance of the formation. The direct current potential of the bit 11 and of the formation in contact therewith is impressed through the alternating current blocking inductance 81, the conductors 80 and 25 and the conductor 47 to the direct current meter 82 which records the potential of the formation. The sensitive or measuring element 90 (which may be responsive to pressure or to other values in the earth) controls the frequency of oscillator 91. The output of oscillator 91 is transmitted through the conductor 25 and the conductor 47 to the alternating current indicator 92 which is sensitive to the frequency range transmitted by the oscillator 91 and which indicates the value of the condition to which the element 90 is sensitive or responsive.

It will be further understood that it is not essential that the apparatus inside of box 28 which is shown in Fig. 4 of the drawing be employed. In a less desirable practice of the invention shown in Figure 4a the conductor 25 connects directly to bow springs 30 which in turn connect to drill bit 11. This means bypassing such units designated as 49, 48, 50, 30 and the like, which have the purpose of minimizing effect caused by temperature changes along conductor 25, which are often of such magnitude as to change the resistance of the line to such extent that the indicated resistivity of the formation would be seriously in error if compensating means were not used.

I claim:

1. Apparatus for ascertaining the resistivity of a subterranean formation at the instant of penetration of such formation by a rotating drill bit as the drilling proceeds, comprising a drill bit, a drill string electrically insulated from said bit, an electrical conductor extending through said drill string, a source of current at the surface of the well, means for connecting said source of current to said conductor while said drill string is rotating, means for raising and lowering said conductor in said drill string, a probe supported in said drill string by said conductor, said probe having first and second portions electrically insulated from each other, a circuit including said conductor for impressing a difference in potential on said first and second portions of said probe, indicating means at the surface for indicating resistance to flow of current between said first and second portions of said probe, electrical contact means effective while said probe is in a first position relative to said bit for placing one of said portions of said probe in contact with said drill string and the other of said portions of said probe in contact with said bit whereby current flows through the formation surrounding said bit, said electrical contact means being effective while said probe is in a second position relative to said bit to insulate one of said portions of said probe from contact with said bit and drill string whereby said indicating means may be calibrated for maximum resistance, and said electrical contact means being effective while said probe is in a third position relative to said bit to place said upper and lower portions of said probe in contact with said drill string whereby said indicating means may be calibrated for minimum resistance.

2. Apparatus for ascertaining the resistivity of a subterranean formation, comprising a drill bit, a drill string electrically insulated from said bit, an electrical conductor extending through said drill string, a source of current at the surface of the well, means for connecting said source of current to said conductor, means for raising and lowering said conductor in said drill string, a probe supported in said drill string by said conductor, said probe having first and second portions electrically insulated from each other, a circuit including said conductor for impressing a difference in potential on said first and second portions of said probe, indicating means at the surface for indicating resistance to flow of current between said first and second portions of said probe, and electrical contact means effective while said probe is in a first position relative to said bit for placing one of said portions of said probe in contact with said drill string and the other of said portions of said probe in contact with said bit whereby current flows through the formation surrounding said bit, and said electrical contact means being effective while said probe is in a second position relative to said bit to insulate one of said portions of said probe from contact with said bit and drill string whereby said indicating means may be calibrated for maximum resistance.

3. Apparatus for ascertaining the resistivity of a subterranean formation, comprising a drill bit, a drill string electrically insulated from said bit, an electrical conductor extending through said drill string, a source of current at the surface of the well, means for connecting said source of current to said conductor, means for raising and lowering said conductor in said drill string, a probe supported in said drill string by said conductor, said probe having first and second portions electrically insulated from each other, a circuit including said conductor for impressing a difference in potential on said first and second portions of said probe, indicating means at the surface for indicating resistance to flow of current between said first and second portions of said probe, and electrical contact means effective while said probe is in a first position relative to said bit for placing one of said portions of said probe in contact with said drill string and the other of said portions of said probe in contact with said bit whereby current flows through the formation surrounding said bit, and said electrical contact means being effective while said probe is in a second position relative to said bit to place said upper and lower portions of said probe in contact with said drill string whereby said indicating means may be calibrated for minimum resistance.

PHILIP W. MARTIN.

References Cited in the file of this patent

UNITED STATES PATENTS

| Number | Name | Date |
|---|---|---|
| Re. 21,102 | Jakosky | May 30, 1939 |
| 2,070,912 | McDermott | Feb. 16, 1937 |
| 2,085,664 | Karcher | June 29, 1937 |
| 2,247,417 | Silverman et al. | July 1, 1941 |
| 2,249,769 | Leonardon | July 22, 1941 |
| 2,370,818 | Silverman | Mar. 6, 1945 |
| 2,400,170 | Silverman | May 14, 1946 |
| 2,569,390 | Sewell | Sept. 25, 1951 |

FOREIGN PATENTS

| Number | Country | Date |
|---|---|---|
| 855,599 | France | Feb. 19, 1940 |

Certificate of Correction

Patent No. 2,650,067                                August 25, 1953

PHILIP W. MARTIN

It is hereby certified that error appears in the printed specification of the above numbered patent requiring correction as follows:

Column 3, line 4, for "conduit" read *conduct*;

and that the said Letters Patent should be read as corrected above, so that the same may conform to the record of the case in the Patent Office.

Signed and sealed this 13th day of October, A. D. 1953.

[SEAL]

ARTHUR W. CROCKER,
*Assistant Commissioner of Patents.*